Figure 1:
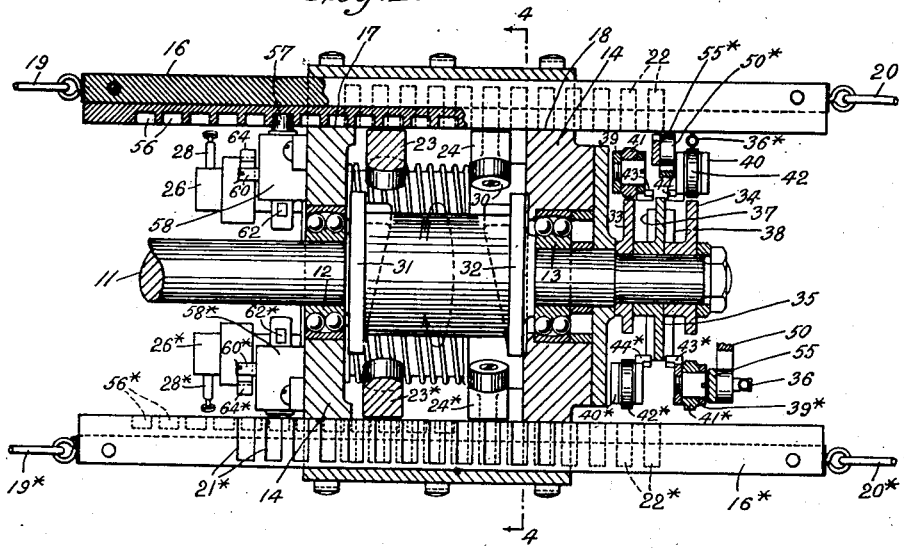

R. M. RUCK.
MEANS FOR CONTROLLING AIRCRAFT.
APPLICATION FILED APR. 25, 1919.

1,355,510.

Patented Oct. 12, 1920.
3 SHEETS—SHEET 1.

R. M. RUCK.
MEANS FOR CONTROLLING AIRCRAFT.
APPLICATION FILED APR. 25, 1919.

1,355,510.

Patented Oct. 12, 1920.

3 SHEETS—SHEET 2.

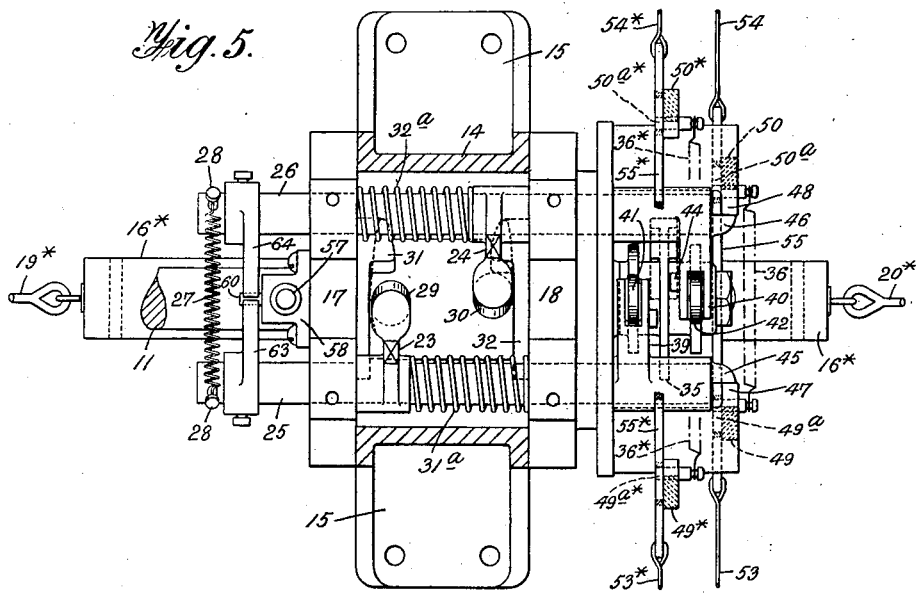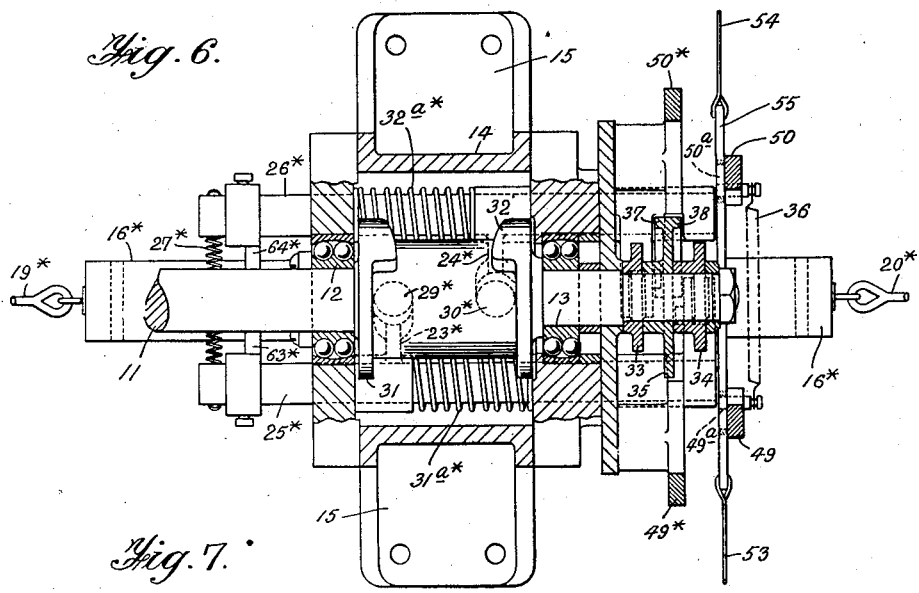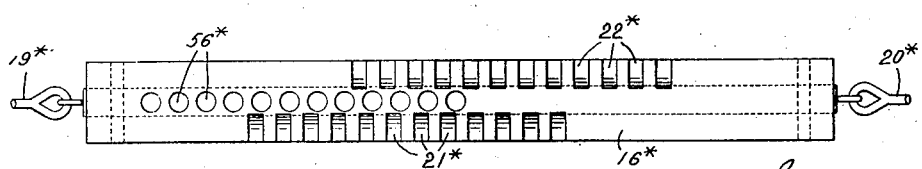

UNITED STATES PATENT OFFICE.

RICHARD MATTHEWS RUCK, OF SOUTH KENSINGTON, LONDON, ENGLAND.

MEANS FOR CONTROLLING AIRCRAFT.

1,355,510.  Specification of Letters Patent.  Patented Oct. 12, 1920.

Application filed April 25, 1919. Serial No. 292,642.

*To all whom it may concern:*

Be it known that I, RICHARD MATTHEWS RUCK, a subject of the King of Great Britain, and resident of 44 Thurloe Square, South Kensington, London, England, have invented a certain new and useful Improvement in Means for Controlling Aircraft, of which the following is a specification.

In an aircraft, the actuation of the various controls by manual power alone sometimes imposes upon the pilot, especially in large or high-power machines, a strain so heavy as to render it advisable to employ mechanical in place of manual power for the purpose. Arrangements hitherto proposed for enabling the substitution to be effected have, however, been subject to certain practical disadvantages, and it is the object of the present invention to overcome the difficulties involved by providing means whereby to permit of the aircraft-controls being actuated step-by-step positively by mechanical power (say, that of the aircraft engine itself, or of a wind-motor or an independent servo-motor) through the medium of automatically-acting control-mechanism of the kind described in the specification of my previous Letters Patent No. 1,277,130 as applied to the control of power-operated change-speed gear in *e. g.* an automobile vehicle.

The automatic control-mechanism described in the specification referred to is adapted to produce by mechanical power a step-by-step positive motion in either of two opposite directions alternatively, a single step being performed at each complete cycle of operation of the mechanism, and each cycle, although initiated at will, being automatically carried to completion before the mechanism is thrown out of action. In the construction more particularly described and illustrated in the specification just mentioned, the automatic control-mechanism comprises a continuously-rotated power-driven cam-shaft carrying a series of cams, namely, a locking-cam for controlling a pair of spring-pressed locking-levers, selectively releasable by hand, whereby the mechanism for producing motion in either direction is normally held out of operation and whereby the manual initiation of a cycle of operations is effected or permitted; a timing-cam for actuating a pair of timing-levers whereby to determine the moment of actual initiation of a cycle of operations of the mechanism, and whereby also to insure that a cycle of operations, when once initiated, shall be carried to completion before the mechanism is thrown out of action; and a pair of oppositely-acting main cams both of which are normally inoperative but one or the other of which, alternatively, can be put into driving connection, by means of one or the other of a pair of bell-crank levers splined upon corresponding rocking-shafts which also carry the timing-levers, with a main slide from which the control-motions required are derived; this slide being notched at opposite sides for engagement by the respective bell-crank levers, and the main cams serving to displace the slide from a neutral position in opposite directions respectively, or to return the slide to neutral position after such displacement (as the case may be); while the connection between each main cam and the slide is such that for each cycle of operations performed by the automatic control-mechanism the slide will be moved in one or the other direction to the extent of only a single step, on the completion of which the timing-mechanism will automatically become locked, by the action of the locking-cam, against further action until another step is manually initiated.

According to the present invention each aircraft-control, which would usually include a pair of cables adapted to exert a pull in opposite directions respectively, has its cables (or equivalent elements) connected with a separate main slide actuated by an automatic control-mechanism of the same general character as that above described, the slide having two series of notches (for engagement by the respective bell-crank levers of a pair as before) and the number of notches in each series corresponding to the number of steps comprised in the total movement required for shifting the aircraft-control from neutral position to each of its extreme positions or vice versa.

For the purpose of insuring that the main slide shall be positively locked on the completion of each step of its movement in either direction, a spring-pressed locking-pin movable in a stationary guide is adapted to then enter one or other of a row of holes in the slide, this locking-pin being automatically withdrawn by means of an arm moving as one with that timing-lever which is manually released in order to initiate, or permit the initiation of, a cycle of operation of the automatic control-mechanism. Both timing-levers are independently capable of effecting the withdrawal of the locking-pin, while the locking-pin itself becomes automatically reëngaged with the main slide on the completion of a step of movement of the slide in the direction corresponding to that locking-lever which was released. The selective release of one or the other of the locking-levers of a pair appertaining to each automatic control-mechanism, may be effected by the pilot by any convenient means.

The pair of cables (or equivalent elements) appertaining to each aircraft-control may be attached permanently to the main slide of the corresponding automatic control-mechanism and also to the aircraft control-lever, or to the hand-wheel rotatably mounted on the aircraft control-pillar, or to such other element as may be manually controllable by the pilot, so that such lever, hand-wheel, or other element will be automatically caused to follow the movements imparted to the aircraft-control by the automatic control-mechanism. In order, however, that each automatic control-mechanism may be thrown out of operation at will so as to permit of the corresponding aircraft-control being actuated manually by usual means if necessary, the locking-pin (previously mentioned) appertaining to the particular automatic control-mechanism may be so connected with a small hand-lever or other suitable device as to be capable of being withdrawn by the pilot from engagement with the main slide without either of the timing-levers of the corresponding pair being released, so that, on the locking-pin being thus withdrawn, the main slide will be free to move to-and-fro as one with the corresponding pair of control-cables as these are manually operated, the automatic control-mechanism meanwhile remaining out of action.

Figure 2:
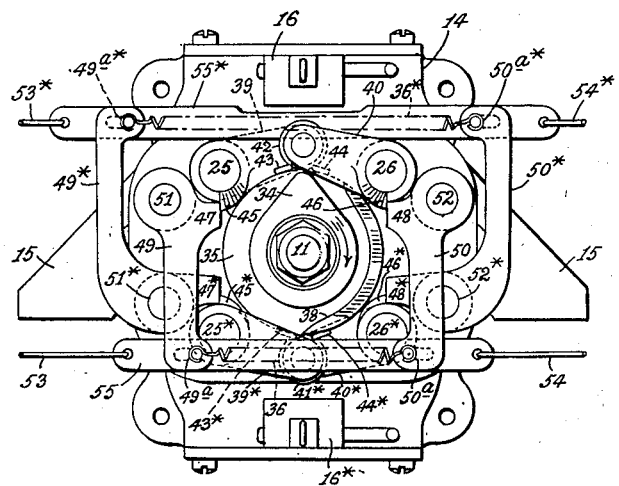
Figure 3:
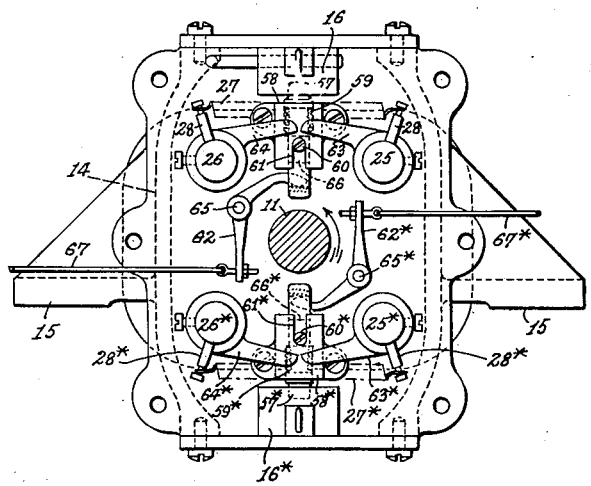

The accompanying drawings illustrate an example of the invention as applied to what may be termed a twin control-mechanism, wherein two main slides, to each of which a separate pair of aircraft control-cables is attached, are both adapted to be actuated by means of a single pair of main cams mounted upon a single power-driven cam-shaft which also carries a pair of locking-cams and a pair of timing-cams, these locking and timing cams serving, in combination with two separate pairs of locking-levers and two separate pairs of timing-levers, to control the actuation of either or both of the main slides at will. In the drawings, Figure 1 is a side elevation of the twin control-mechanism, which is shown partly in section. Fig. 2 is an end elevation, as viewed from the right-hand side of Fig. 1. Fig. 3 is an end elevation, as viewed from the left-hand side of Fig. 1. Fig. 4 is a transverse section on line 4—4 of Fig. 1. Fig. 5 is a top plan view with the cover-plate and upper main slide removed. Fig. 6 is a plan view, in section on the axis of the power-driven cam-shaft. Fig. 7 is a plan view of the lower of the two main slides, shown separately. Figs. 8 and 9 are perspective views of the respective "main" cams shown separately. In all the figures, various parts are omitted for the sake of clearness.

The power-driven cam-shaft 11, which is continuously driven (by any suitable means, not shown), extends horizontally through, and is journaled in ball thrust bearings 12, 13 at the respective ends of a casing 14 provided with a pair of laterally-projecting brackets 15, 15 by means of which the casing may be secured in position where required. The two (upper and lower) main slides 16 and 16* are respectively fitted to move lengthwise to-and-fro, in guides 17, 18 and 17*, 18* in the casing 14, in positions directly above and beneath the cam-shaft 11 and in directions parallel therewith. One pair of control-cables 19, 20 are attached to the respective ends of the upper main slide 16, while a separate pair of control-cables 19*, 20* are attached to the respective ends of the lower main slide 16*; the two members of each pair of control-cables being led in opposite directions respectively so that, when the corresponding main slide is caused to move lengthwise in either direction, the one member of the pair of cables will be pulled upon and the other member will be relaxed. The means for actuating the upper main slide 16 will now be described.

The slide 16 has a series of notches 21 (twelve being shown in the example) cut at equal intervals apart along one of its lower edges, and an equal number of similar notches 22 at equal intervals apart along its other lower edge; any one of the notches 21, all of which are of equal width measured lengthwise of the slide, being adapted to be engaged by a bell-crank lever 23, and any one of the notches 22, which also are all of equal width, being likewise adapted to be engaged by a bell-crank lever 24. The bell-crank levers 23 and 24 are respectively splined upon rocking-shafts 25 and 26 which extend, parallel with the cam-shaft 11, symmetrically at opposite sides of the interior of the casing 14, which is provided at its ends with bearings for the reception of the shafts; the rocking-shafts 25 and 26, and hence also the levers 23 and 24 which project inward from the shafts, constantly tending to move angularly so as to cause said levers to engage the slide 16 from opposite sides, under the stress of a tension-spring 27 stretched between radial arms 28 fixed to the respective rocking-shafts 25 and 26. When the shaft 25 is permitted (as hereinafter explained) to turn under the stress of the spring 27, this angular movement of the shaft 25 brings the bell-crank lever 23 into angular position for engaging any one of the notches 21, and at the same time causes a roller 29 carried by said lever to be presented in position to be engaged by a "main" cam 31 which is fast on the cam-shaft 11 at one end of the space within the casing 14; and similarly, when the shaft 26 is permitted to turn under the stress of the spring 27, its angular movement brings the bell-crank lever 24 into angular position for engaging any one of the notches 22, and at the same time causes a roller 30 carried by said lever to be presented in position to be engaged by a "main" cam 32 which is fast on the cam-shaft 11 at the other end of the same space. The cam-shaft is caused to revolve continuously in one direction, and the main cams 31 and 32 are face-cams so formed that each is adapted to engage and thrust the corresponding bell-crank lever 23 or 24 along the rocking-shaft 25 or 26 toward the other main cam during an angular interval equal to rather less than one half of a revolution of the cam-shaft 11; which angular interval will hereinafter be referred to as the operative portion of a revolution of the shaft 11 and main cams 31, 32, while the complementary angular interval will be referred to as the idle portion of a revolution. It will thus be seen that the revolution of the cam-shaft 11 has for effect to cause whichever of the bell-crank levers (if either of them), happens to be in operative position, to move lengthwise of the corresponding rocking-shaft a distance equal to the distance apart of any two adjacent notches of the corresponding series on the main slide 16. Such sliding movement of either bell-crank lever is always performed from a normal position (see Fig. 1) near one end of the casing 14 toward the opposite end of the casing, and is effected in opposition to the stress of a spring interposed in compression between the hub of the particular bell-crank lever and the opposite end of the casing; the springs 31$^a$ and 32$^a$ acting thus in opposition to the main cams 31 and 32 respectively. Hence, when the bell-crank lever 23, having been engaged with one of the notches 21 on the main slide 16, has been displaced in the one direction by the action of the main cam 31 so as to cause the slide 16 to move one step (i. e. the distance between two adjacent notches 21) in the same direction, then, on the rocking-shaft 25 being subsequently returned to normal angular position (as hereinafter explained), the bell-crank lever 23, which is thereby disengaged from both the main cam 31 and the slide 16, will at once be restored by the spring 31$^a$ to normal position. Similarly, when the bell-crank lever 24, having been engaged with one of the notches 22 on the main slide 16, has been displaced in the other direction by the action of the main cam 32 so as to cause the slide 16 to move one step in this latter direction, then, on the rocking-shaft 26 being subsequently returned to normal angular position, the bell-crank lever 24, which is thereby disengaged from both the main cam 32 and slide 16, will at once be restored by the spring 32$^a$ to normal position.

It is to be understood that the main cam 31 coöperates only with the bell-crank lever 23, and serves to displace this lever always in one direction lengthwise of its rocking-shaft 25, whereas the main cam 32 coöperates only with the bell-crank lever 24, and serves to displace the latter always in the opposite direction lengthwise of its rocking-shaft 26. While, however, the main slide 16 may be moved, in either direction alternatively, to the extent of any number of steps up to the number comprised in the corresponding series of notches 21 or 22, it is to be observed that, after the completion of each such step, the bell-crank lever 23 or 24 which for the time being was in operation must be disengaged from the main slide and from the main cam 31 or 32 and allowed to return to normal position lengthwise of its rocking-shaft 25 or 26 before a fresh step can be commenced.

As already stated, both rocking-shafts 25 and 26 constantly tend, under the stress of the spring 27, to turn so as to cause the bell-crank levers 23 and 24 not only to engage the notches of the series 21 and 22 on the main slide 16, but also to present themselves in position for actuation by the main cams 31 and 32. Only one rocking-shaft, however, is allowed to turn thus at one time, whichever shaft has been so turned remaining in its abnormal angular position until after the completion of the resulting movement of the main slide; whereupon said rocking-shaft is caused to return to its normal angular position so as, by disengaging its bell-crank lever from both the main cam and main slide, to permit the spring 31$^a$ or 32$^a$ to restore said lever to normal position lengthwise of the rocking-shaft. The means for effecting such control of the rocking-shafts will now be described.

The cam-shaft 11 is prolonged beyond the right-hand end of the casing 14 (Figs. 1 and 5) and has fast upon it, outside the casing, three cams. Two of these constitute a pair of exactly similar edge-cams 33 and 34 hereinafter termed locking-cams, while the third, placed between said locking-cams, consists of a disk 35 provided on its opposite faces with a pair of exactly similar laterally-projecting flanges 37 and 38 which extend around rather less than half the circuit of the disk and each of which corresponds in angular extent and position with the operative portion of the revolution of the shaft 11 and main cams 31, 32. These flanges 37, 38 constitute what are hereinafter termed timing-cams, so that the disk 35 with its pair of flanges 37 and 38 may be regarded as together constituting a duplex timing-cam. The rocking-shafts 25 and 26 also project beyond the same end of the casing 14, and have fast upon them, outside the casing, levers 39 and 40 (hereinafter termed timing-levers) which carry antifriction rollers 41 and 42 adapted to bear against the edges of the locking cams 33 and 34; these timing-levers being provided, on the mutually adjacent faces of the respective levers, with laterally-projecting lugs 43 and 44 each of which normally remains outside the path of the corresponding timing-cam flange 37 or 38 but is adapted to be presented beneath such flange during a considerable portion of the interval when the corresponding timing-lever 39 or 40, on being unlocked, is displaced from normal position by the action of the spring 27. The angular interval during which the timing-cam flanges 37, 38 are passing the lugs 43, 44 coincides substantially with that operative portion of a revolution of the shaft 11 wherein alone the main cam 31 or 32 can shift the main slide in one direction or the other; and during such interval each of the lugs 43, 44 either on the one hand prevents its timing-lever 39 or 40 from moving so as to engage the corresponding locking-cam 33 or 34, or on the other hand prevents its timing-lever (if already in position to engage the corresponding locking-cam) from moving out of engagement therewith.

The rocking shafts 25 and 26 are normally held in their inoperative angular position (which is that illustrated in the drawings), against the stress of the spring 27, by the engagement, with nibs 45 and 46 on the timing-levers 39 and 40, of detents 47 and 48 on levers 49 and 50 (hereinafter referred to as locking-levers) which are fulcrumed to the end of the casing 14 at axes 51 and 52; these locking-levers 49 and 50 being drawn toward one another by a tension spring 36 interposed between the free ends of the respective levers so that the detents 47 and 48 constantly tend to engage the nibs 45 and 46. Either locking-lever 49 or 50, alternatively, may be so moved as to cause its detent 47 or 48 to become disengaged from the nib 45 or 46 on the timing-lever 39 or 40, by moving lengthwise, in the appropriate direction, a link 55 which extends between the free ends of the locking-levers and has a pin-and-slot connection with each as indicated respectively at 49$^a$ and 50$^a$; wires 53 and 54 being attached to the opposite ends of the link 55 so as to enable the latter to be actuated in either direction at will.

In the case of each pin-and-slot connection at 49$^a$ and 50$^a$ in the example illustrated, the pin is fixed in the lever and normally rests at the inner end of the co-acting slot in the link 55; such an arrangement (or its equivalent) being necessary on the one hand, in order to permit of either locking-lever 49 or 50 being moved without disturbing the other, and, on the other hand, in order to insure that so long as either of said levers is held in position to unlock the corresponding timing-lever 39 or 40, the other locking-lever shall not be displaced from normal position to unlock the remaining timing-lever.

The wires 53 and 54 extend outward from the respective levers 49 and 50 in opposite directions, and may be led to some convenient point in proximity to the pilot's seat, where they may be attached from opposite sides to (say) a small hand-lever or equivalent device (not shown) in such manner that, so long as this hand-lever occupies a mid or neutral position, both locking-levers are free to assume the angular position wherein their detents 47 and 48 are able to engage the nibs 45 and 46; whereas, according as the hand-lever is moved to one or the other side of its mid position, the wire 53 or 54 will be pulled-upon and the locking-lever 49 or 50 will be moved outward so as to withdraw the detent 47 or 48 from engagement with the nib 45 or 46, with the result that the rocking-shaft 25 or 26 will be permitted to turn so as to bring the timing-lever 39 or 40 into position to become subject to the control of the corresponding timing-cam 37 or 38 and locking-cam 33 or 34.

The arrangement as a whole is such that, assuming (say) that the pilot exerts a pull upon the wire 53 so as, by displacing the locking-lever 49 from normal position, to disengage the detent 47 from the nib 45 and thus free the timing-lever 39 and rocking-shaft 25 to the action of the spring 27, the bell-crank lever 23 will in consequence of this be enabled both to engage one of the row of notches 21 on the main slide 16 and also to present itself in position to be actuated by the main cam 31; but it is to be observed that such angular movement of the timing-lever 39, rocking-shaft 25, and bell-crank lever 23, although permitted as a result of the actuation of the locking-lever 49, can only take place actually during the "idle" portion of the revolution of the shaft 11, after the nose or projecting portion of the locking-cam 33 has been carried, by the revolution of the cam-shaft 11, out of the position shown in Fig. 1. It is also to be observed that, so long as either of the lugs 43 or 44 is above the path of the timing-cam flange 37 or 38 when the latter is at the upper part of its path, such flange will prevent the corresponding timing-lever 39 or 40, even if unlocked, from leaving its inoperative position.

The cam-shaft 11 revolves clockwise as viewed in Fig. 2, and after the nose of the locking-cam 33 has passed (toward the right in said figure) out of contact with the roller 41 on the timing-lever 39, this lever descends so that the lug 43 upon it is presented in position to underlie the timing-cam flange 37 during the next succeeding operative position of the revolution of the cam-shaft 11 and main cam 31. The timing-lever 39 being now in its operative position, the bell-crank lever 23 remains in engagement with one of the row of notches 21 on the main slide 16 until, during the next succeeding operative portion of the revolution of the cam-shaft 11 and main cam 31, the bell-crank lever 23 has been shifted lengthwise of the rocking-shaft 25 and the main slide 16 has been moved through a distance equal to that between two adjacent notches of the series 21; such movement of the main slide 16 taking place, of course, only in that direction in which the main cam 31 is adapted to shift the bell-crank lever 23. After this operation has been completed, the timing-cam flange 37 passes out of position to engage over the lug 43, and after the close of this second half-revolution the nose of the locking-cam 33 encounters the roller 41 and forces back the timing-lever 39 to the normal position shown, wherein (assuming the pull on the wire 53 to have been meanwhile relaxed) said lever immediately becomes re-locked by the engagement, under the action of the spring 36, of the detent 47 with the nib 45. The return of the timing-lever 39 to normal position involves the return of the rocking-shaft 25 to its normal angular position and the disengagement of the bell-crank lever 23 from the main slide 16 and main cam 31; with the result that the bell-crank lever is freed to the action of the spring 31ª, whereby it is immediately restored to normal position lengthwise of the rocking-shaft 25. Hence all parts again occupy their normal positions, leaving however (as hereinafter explained) the main slide 16 in the position to which it has been brought and in which said slide not only presents a fresh notch of the series 21 in position to be engaged by the same bell-crank lever 23 if this lever should again be put into operation by a repetition of the cycle of movements just described, but also presents a notch of the series 22 in position to be engaged by the other bell-crank lever 24 if the latter should be put into operation by the alternative cycle of movements, as will be readily understood.

It is to be observed that the use of the disk 35 and timing-cam flanges 37, 38 is not essential, as these flanges are not designed to force down, or normally hold down, the lugs 43, 44 and levers 39, 40, but are merely intended to provide a safe-guard against the accidental displacement, from operative or inoperative position respectively of whichever of said levers happens to be in or out of use, during approximately that portion of a revolution of the cam-shaft 11 which corresponds with the performance of a step of movement imparted to the main slide 16. The stress of the spring 27 is sufficient, under all ordinary conditions, to retain the roller 41 or 42 securely in contact with the locking-cam 33 or 34 as long as may be required.

It will be obvious, without further explanation, that if the pilot were to exert a pull not upon the wire 53 but upon the wire 54, the alternative cycle of operations would be performed by the fellow-set of parts which are associated with the main cam 32; the result in this case being that the main slide 16 would be engaged by the bell-crank lever 24 and would be moved thereby, under the action of the main cam 32, one step in the reverse direction. After each such movement of the main slide in either direction, a fresh movement either in the same or in the opposite direction may be brought about by the pilot pulling (or continuing to pull) upon the wire 53 or 54 as the case may be, the extent of the movement which the main slide can perform in each direction being only limited by the available number of notches in the series 21 or 22.

When the main slide 16 has been moved (in the manner just explained) from what may be termed a balanced position, i. e. one wherein the forces acting upon it from opposite directions through the control-cables 19 and 20 respectively balance one another, to a position wherein one of said control-cables is put under greater tension than the other owing to the pressure of the air during flight against that flight-governing element (e. g. aileron or elevator) to which the more heavily strained control-cable is connected (directly or indirectly), it will be evident that the main slide 16 will not of itself remain in the position to which it has been shifted, but will, unless prevented, return to its previous or balanced position. In order to prevent such return movement of the main slide 16, or its accidental displacement from the new position, means are provided for automatically locking the slide in each position to which it may be brought.

For this purpose, in the example illustrated, the main slide 16 is provided on its underside with a longitudinal row of holes 56 corresponding in number and pitch with the notches of both rows 21 and 22, and a vertically-movable locking-pin 57, adapted to engage in all the holes 56 in turn, is slidably mounted in a bearing 58, beneath the slide 16, upon the casing 14 at the left-hand end of the latter (see Figs. 1 and 3). The locking-pin 57 constantly tends, under the pressure of a spring 59, to engage in whichever of the holes 56 is at the moment presented above it; such hole corresponding, as regards its position in the row, with the particular notch of the row 21 or 22 with which the bell-crank lever 23 or 24 is for the time being engaged. A stud 60, which projects from the locking-pin 57 through a slot 61 in the bearing 58, is adapted to be engaged and forced downward by either one of a pair of radial arms 63, 64 fast on the projecting end portions of the respective rocking-shafts 25, 26, when the particular rocking-shaft which for the time being is in use is allowed to turn from the normal to the operative angular position as already described; the arrangement being such that, on the one hand, just before the bell-crank lever 23 or 24 begins to move lengthwise of its rocking-shaft 25 or 26 and to transmit movement to the main slide 16, the locking-pin 57 will, as a result of the depression of the arm 63 or 64, be withdrawn from the hole 56 with which it is engaged; whereas on the other hand, just before the bell-crank lever 23 or 24, having shifted the main slide 16 to the extent of one step of its movement, becomes completely disengaged from a notch 21 or 22 in the slide, the return angular movement of the rocking-shaft 25 or 26 will, as a result of the raising of the arm 63 or 64, permit the locking-pin 57 to engage in the fresh hole 56 now presented above it, thus effectually locking the main slide 16 against longitudinal displacement in either direction.

It is to be understood that the control-cables 19, 20 would as a rule be connected, not only to opposite ends of the main slide 16, but also from opposite directions to the aircraft control-lever, or to the hand-wheel rotatably mounted on the aircraft control-pillar, or to such other manually-operable element as is usually provided for enabling the pilot to actuate the connected flight-governing element (e. g. a pair of ailerons or an elevator) by manual power; and that, consequently, the automatic actuation of the control-cables 19, 20 by the main slide 16 will produce a corresponding movement of said manually-operable element, so that the pilot will be relieved of physical exertion. Circumstances may, however, arise in which it becomes necessary for the pilot to exercise manual control of the connected flight-governing element directly, and it is evident that, in such circumstances, not only must the automatically-acting mechanism which has been described above be left out of action for the time being, but the locking-pin 57 must also be withdrawn from and held out of engagement with the holes 56 in the main slide 16 so as to permit of the latter moving freely to-and-fro in response to the motions imparted by the pilot to the control-cables 19, 20. For this purpose a small lever 62, fulcrumed at 65 on the end of the casing 14 and engaging by one of its arms in a slot 66 in a downward prolongation of the locking-pin 57, has attached to its other arm a wire 67 which is led to a point in convenient proximity to the pilot's seat, where this wire may be provided with means (not shown) for enabling it to be pulled upon at will and held under tension so long as it may be desired to keep the main slide unlocked.

The mechanism for actuating the lower main slide 16* is similar to that above described for actuating the upper main slide 16, all parts of the upper set of mechanism being duplicated for the lower set of mechanism, with the exception of the cam-shaft 11, main cams 31, 32, locking-cams 33, 34, timing-cam disk 35 and timing-cams 37, 38, which serve in common for both sets of mechanism. As those parts of the lower set which correspond respectively with the several parts of the upper set of mechanism merely occupy relatively inverted positions, and are distinguished on the drawings by the same reference symbols with the addition of an asterisk (*), it will be unnecessary to repeat, with reference to the lower set of mechanism, the description already given above of the upper set of mechanism and its operation.

Instead of a tension-spring such as 27 being employed for the purpose of turning the rocking-shafts 25, 26 in the direction to cause the rollers 41, 42 on the timing-levers 39, 40 to bear against the edges of the locking-cams 33, 34 respectively, the springs 31ª, 32ª may be utilized not only as compression-springs for causing the bell-crank levers 23, 24 to slide back along the shafts 25, 26 to normal position after each actuation, but also as torsion-springs for rocking the shafts 25, 26; the ends of the springs 31ª, 32ª being for this purpose made to engage in holes in the bell-crank levers 23, 24 and in the ends of the casing 14, as will be readily understood. A similar arrangement would in such case be adopted for the lower set of mechanism, in place of the tension-spring 27*.

It is to be understood that the two sets of mechanism, upper and lower, are capable of being brought into operation concurrently if desired, and that, although both sets of mechanism are dependent for their operation on the same main cams, locking-cams, and timing-cams, the action of the one set of mechanism in no way interferes with that of the other; so that the pilot is enabled to effect simultaneous control of two separate flight governing elements (e. g. a pair of ailerons and an elevator) when necessary, and to cause these to be actuated respectively in either direction at will, and to any extent within the limits imposed by the number of notches provided in the main slides 16 and 16*.

What is claimed is:—

1. Apparatus for controlling a flight governing element or elements (such for example as a pair of ailerons, or an elevator) of an aircraft, to be actuated by mechanical power under the control of the pilot, comprising, the combination with a pair of control cables for actuating such flight governing element or elements in opposite directions respectively, and a main controlling member connected to said cables and movable to-and-fro so as to impart motion to said flight governing element or elements in the one or other direction alternatively, of mechanically operated, automatically acting control mechanism adapted to actuate said main controlling element step by step in either direction alternatively at will, comprising a constantly driven actuating element and motion imparting devices for connecting the main controlling member to the actuating element at will, substantially as and for the purpose set forth.

2. Apparatus as claimed in claim 1, wherein means are provided for automatically preventing a step of movement being imparted to the main controlling-member in the one direction during the period intervening between the initiation and completion of a step of movement by said member in the contrary direction.

3. Apparatus as claimed in claim 1, wherein means are provided for automatically locking the main controlling-member against movement in either direction after the completion of each step of such movement, and for automatically effecting the unlocking of said member immediately before a fresh step of movement in either direction.

4. Apparatus as claimed in claim 3, wherein means are provided for enabling the main controlling-member to be unlocked at will so as to permit said member to be actuated manually.

5. Apparatus as claimed in claim 1, comprising a main controlling member for attachment to a pair of controls, movable lengthwise to-and-fro in unison therewith, and having two longitudinal rows of equidistant notches; a continuously-rotated power-driven cam-shaft extending parallel to the direction of motion of said main controlling member; a pair of oppositely-acting face-cams fast on said cam-shaft; a pair of rocking-shafts extending parallel to the cam-shaft and constantly tending under spring-action to assume an operative angular position; a pair of bell-crank levers splined upon the respective rocking-shafts and each adapted, according as the corresponding rocking-shaft occupies the operative or the inoperative angular position, to engage a notch of one series on the main controlling member and to be presented in position for being moved by one of said face-cams lengthwise of the rocking-shaft through a distance equal to the interval between two adjacent notches or to be disengaged from both the main controlling member and said face-cam; a pair of timing-levers fast on the respective rocking-shafts; a timing-cam fast on the cam-shaft and arranged so to control the angular movement of the respective timing-levers as to insure only one of said levers being brought to and retained in operative position during a single revolution of the cam-shaft; a locking-cam fast on the cam-shaft and adapted at each revolution thereof to return to inoperative position that timing-lever which had previously been brought to operative position; a pair of locking-levers constantly tending under spring-action to retain the respective timing-levers in their inoperative position; and means for enabling either of said locking-levers alternatively to be disengaged at will from the corresponding timing-lever; substantially as and for the purpose set forth.

6. In apparatus as claimed in claim 5, the combination of a main controlling member provided with a longitudinal row of equidistant holes spaced apart at distances corresponding to the distance between the notches of each row on said slide; a locking-pin constantly tending under spring-action to engage in one or other of said holes so as to prevent longitudinal movement of the main controlling member; and means for enabling said locking-pin to be withdrawn at will from engagement with said holes, substantially as set forth.

7. Apparatus for controlling a flight governing element or elements (such for example as a pair of ailerons, or an elevator) of an aircraft, to be actuated by mechanical power under the control of the pilot, comprising, a main controlling member constructed and arranged to be operatively connected to the flight governing element or elements, a continuously driven actuating element, motion imparting devices for connecting the main controlling member to the actuating element to cause a step by step movement to be imparted to the main controlling member said motion imparting devices being normally inoperative, but operable under the control of the pilot to cause one step of movement to be imparted to the main controlling member; means for automatically insuring the completion of such step of movement; means for automatically rendering said motion imparting devices inoperative upon the completion of such step of movement of said main controlling member substantially as and for the purpose set forth.

RICHARD MATTHEWS RUCK.